United States Patent
Ukita et al.

(10) Patent No.: US 6,424,739 B1
(45) Date of Patent: Jul. 23, 2002

(54) IMAGE DATA COMPRESSION APPARATUS CAPABLE OF REDUCING FALSE COLOR

(75) Inventors: Shinji Ukita, Kawanishi; Masao Tamashima, Sakai, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/102,664

(22) Filed: Jun. 23, 1998

(30) Foreign Application Priority Data

Jun. 25, 1997 (JP) .............................................. 9-169054

(51) Int. Cl.[7] ................................................. G06K 9/00
(52) U.S. Cl. ....................................... 382/166; 382/232
(58) Field of Search ................................ 382/232, 239, 382/166; 348/404.1, 405.1, 397.1; 375/240, 240.29

(56) References Cited

U.S. PATENT DOCUMENTS

| | | | |
|---|---|---|---|
| 5,249,053 A | | 9/1993 | Jain |
| 5,729,633 A | * | 3/1998 | Watanabe et al. ........... 382/239 |
| 5,734,677 A | * | 3/1998 | Liew et al. ................. 382/239 |

FOREIGN PATENT DOCUMENTS

| | | | | |
|---|---|---|---|---|
| DE | 19708195 A | | 6/1997 | |
| EP | 0487282 A2 | | 5/1992 | |
| JP | 1-292987 | | 11/1989 | |
| JP | 5-219380 | | 8/1993 | |
| JP | 5-252403 | | 9/1993 | |
| JP | 6-113146 | | 4/1994 | |
| JP | 7-154798 | | 6/1994 | |
| JP | 7-115668 | | 5/1995 | |
| JP | 8-237672 | | 9/1996 | |
| JP | 10336647 | * | 12/1998 | ............ H04N/7/24 |

OTHER PUBLICATIONS

Copy of translation of Japanese Patent Office Action for corresponding Japanese Patent Application No. 9–169054 dated Sep. 11, 2001.

Copy of Japanese Patent Office Action for corresponding Japanese Patent Application No. 9–169054 dated Sep. 11, 2001.

\* cited by examiner

*Primary Examiner*—Amelia M. Au
*Assistant Examiner*—Jingge Wu
(74) *Attorney, Agent, or Firm*—Armstrong, Westerman & Hattori, LLP (57) ABSTRACT

An image data compression apparatus capable of reducing false color in image data to a minimum when image compression or decompression is performed, including a preliminary image compressing portion for compressing image data in a sampling region set in a specific position on an image plane for obtaining preliminary compressed image data; a data size evaluation value calculating portion for calculating a data size evaluation value from a data length of said preliminary compressed image data; a compression ration determining portion for determining compression ratios of the image data to color and luminance data in accordance with the data size evaluation value such that a data size of compressed image when image compression is performed for the entire image plane of the image data equals to a prescribed desired data size and such that the compression ratio of the image data to the color data equals to or exceeds the compression ratio of the image data to the luminance data; and an image compressing portion for performing image compression for the entire image plane of the image data in accordance with the compression ratios of the image data to the color and luminance data. Also included are a method of compressing image data and a digital camera using the image compression apparatus.

9 Claims, 9 Drawing Sheets

| | A11 | A12 | A13 | | | | | A18 |
|---|---|---|---|---|---|---|---|---|
| | Y11 | Y12 | Y13 | Y14 | Y15 | Y16 | Y17 | Y18 |
| A21 | Y21 | Y22 | Y23 | Y24 | Y25 | Y26 | Y27 | Y28 |
| A31 | Y31 | Y32 | Y33 | Y34 | Y35 | Y36 | Y37 | Y38 |
| | Y41 | Y42 | Y43 | Y44 | Y45 | Y46 | Y47 | Y48 |
| | Y51 | Y52 | Y53 | Y54 | Y55 | Y56 | Y57 | Y58 |
| | Y61 | Y62 | Y63 | Y64 | Y65 | Y66 | Y67 | Y68 |
| | Y71 | Y72 | Y73 | Y74 | Y75 | Y76 | Y77 | Y78 |
| | Y81 | Y82 | Y83 | Y84 | Y85 | Y86 | Y87 | Y88 |
| | A81 | | | | | | | A88 |

FIG.8

| DESIRED FILE SIZE | M1 | M2 | N |
|---|---|---|---|
| 40K | 0.514 | 0.475 | 124.8 |
| 45K | 0.468 | 0.433 | 122.9 |
| 50K | 0.432 | 0.400 | 122.2 |
| 55K | 0.380 | 0.352 | 119 |
| 60K | 0.346 | 0.320 | 117.89 |
| 65K | 0.322 | 0.298 | 116.95 |
| 70K | 0.294 | 0.272 | 115.79 |
| 75K | 0.276 | 0.255 | 115.40 |
| 80K | 0.264 | 0.244 | 115.10 |
| 85K | 0.250 | 0.231 | 114.10 |
| 90K | 0.236 | 0.218 | 113.40 |

FIG.9

IMAGE DATA COMPRESSION APPARATUS CAPABLE OF REDUCING FALSE COLOR

BACKGROUND OF THE INVENTION

1. Field of the Invention

The present invention relates to image data compression apparatuses and, more specifically, to an image data compression apparatus capable of reducing false color in image data to a minimum when image compression or decompression is performed.

2. Description of the Related Art

Recently, an apparatus such as a digital still camera has become increasingly popular. The digital still camera performs image compression for an image pick up signal, which has been obtained by image pick up and digitalized as image data, and stores it in a flash memory.

Figure 2:
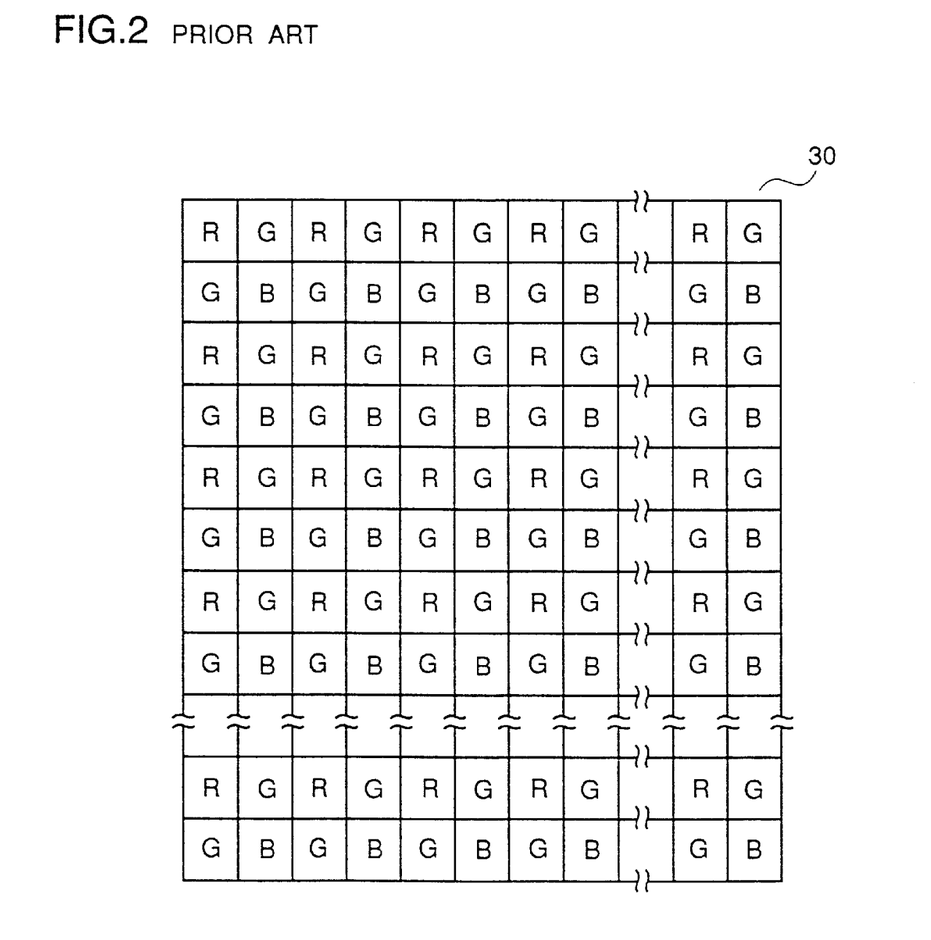
FIG. 2 is a diagram shown in conjunction with color filters mounted to a CCD imager.

An image pick up portion of such digital still camera corresponds to a CCD (Charge Coupled Device) imager to which a primary color filter 30 is mounted including color filters of three primary colors, R (Red), G (Green) and B (Blue), arranged in a mosaic like pattern as shown in FIG. 2. The image data obtained through the CCD imager and corresponding to one image plane is stored in a DRAM (Dynamic Random Access Memory). Thus, the image data stored in the DRAM includes, for a pixel to which one of the R, G and B filters is mounted, only the image data corresponding to that color of the filter, but not the image data corresponding to other two colors. Accordingly, the image data corresponding to other two colors are obtained by interpolation using surrounding pixel values.

Prescribed image compression is performed for the image data after the interpolation, and the image data is stored in the flash memory or the like.

However, the R, G and B filters have different filter characteristics. As a result, in the case of such single plate color digital still camera, in a portion of the image data which should have an uniform color, a different color (which is referred to as a "false color" throughout the specification) appears. A similar problem arises at the edge of the image data. In addition, the R, G and B filters also have different filter characteristics in a three plate color digital still camera. Thus, the false color is similarly generated.

When the image data is stored in the flash memory as a file, it is in most cases handled as a file of a prescribed size for facilitating data handling. Thus, the data is compressed at a suitable compression ratio to effectively utilize a memory region.

When an image compression or decompression processing is performed for the image data at a high compression ratio, an effect of eliminating a high frequency component is provided, so that information in the detail of the image data is lost. In this case, however, the false color is not readily generated. On the other hand, when the image compression or decompression processing is performed at a low compression ratio, information in the detail of the image data is not easily lost. In this case, however, the false color may easily be generated. When image compression is performed at the low compression ratio, a high image quality is generally required. Therefore, the generation of the false color is a serious problem to be solved.

SUMMARY OF THE INVENTION

The present invention is made to solve the aforementioned problem. It is an object of the present invention to provide an image data compression apparatus capable of reducing false color in image data to a minimum when image compression or decompression is performed.

Another object of the present invention is to provide an image data compression apparatus capable of reducing false color in image data to a minimum when image compression or decompression is performed at a low compression ratio.

An image data compression apparatus according to an aspect of the present invention includes: a preliminary image compressing portion compressing image data in a sampling region which has been set in a specific position on an image plane for obtaining preliminary compressed image data; a data size evaluation value calculating portion connected to the preliminary image compressing portion and calculating a data size evaluation value from a data length of the preliminary compressed image data; a compression ratio determining portion connected to the data size evaluation value calculating portion and determining compression ratios of image data to color data and luminance data such that a data size of the compressed image when image compression is performed for the entire image plane of the image data equals to a prescribed desired data size and such that the compression ratio of the image data to the color data equals to or exceeds the compression ratio of the image data to the luminance data; and an image compressing portion connected to the compression ratio determining portion and performing image compression for the entire image plane of the image data in accordance with the compression ratios of the image data to the color and luminance data.

The compression ratio determining portion sets the compression ratios such that the compression ratio of the. image data to the color data is higher than the compression ratio of the image data to the luminance data. Thereby, a high frequency component against the color data is eliminated and generation of a false color in the image data is prevented when an image compression or decompression processing is performed.

Preferably, the compression ratio determining portion includes: a compression ratio predicting portion connected to the data size evaluation value calculating portion and predicting a compression ratio which allows the data size of the compressed image when image compression is performed for the entire image plane of the image data to be equal to the prescribed desired data size in accordance with the data size evaluation value; and a compression ratio adjusting portion connected to the compression ratio predicting portion and setting values which are obtained by increasing and decreasing the compression ratio as the compression ratios of the image data to the color and luminance data, respectively.

The compression ratio adjusting portion sets the compression ratio of the image data to the color data such that it is higher than the compression ratio of the image data to the luminance data. Thereby, the high frequency component against the color data is eliminated and generation of the false color in the image data is prevented when image compression or decompression is performed. More preferably, the image data compression apparatus further includes an image compression mode setting portion setting an image compression mode corresponding to the prescribed desired data size. The compression ratio adjusting portion includes a portion for setting the compression ratios of the image data to the color and luminance data by adding and subtracting first and second values determined in accordance with the prescribed desired data size to and from the compression ratio, respectively.

The larger the desired data size is, the lower the compression ratio obtained from the compression ratio predicting portion is. The lower the compression ratio obtained from the compression ratio predicting portion is, the more the compression ratio adjusting portion increases the value of the compression ratio for setting it as the compression ratio of the image data to the color data. Thus, the compression ratio of the image data to the color data is always set at a high value. Thereby, the high frequency component against the color data is eliminated and generation of the false color in the image data is prevented when image compression or decompression is performed.

A method of compressing image data according to another aspect of the present invention includes steps of: compressing image data in a sampling region which has been set in a specific position on an image plane for obtaining a preliminary compressed image data and calculating a data size evaluation value from a data length of the preliminary compressed image data; determining compression ratios of the image data to color and luminance data in accordance with the data size evaluation value such that a data size of the compressed image when image compression is performed for the entire image plane of the image data equals to a prescribed desired data size and such that the compression ratio of the image data to the color data equals to or exceeds the compression ratio of the image data to the luminance data; and performing image compression for the entire image plane of the image data in accordance with the compression ratios of the image data to the color and luminance data.

In the step of determining the compression ratio, the compression ratio of the image data to the color data is set such that it is higher than the compression ratio of the image data to the luminance data. Thereby, a high frequency component against the color data is eliminated and generation of a false color in the image data is prevented when image compression or decompression is performed.

A digital camera according to still another aspect of the present invention includes: an imager receiving a video signal; an A/D converter digitizing the video signal output from the imager and converting it to image data; a storage device storing the image data; a preliminary image compressing portion compressing the image data in a sampling region which has been set in a specific position on an image plane for obtaining preliminary compressed image data; a data size evaluation value calculating portion connected to the preliminary image compressing portion and calculating a data size evaluation value from a data length of the preliminary compressed image data; a compression ratio determining portion connected to the data size evaluation value calculating portion and determining compression ratios of the image data to color and luminance data in accordance with the data size evaluation value such that a data size of the compressed image when image compression is performed for the entire image plane of the image data equals to a prescribed desired data size and such that the compression ratio of the image data to the color data equals to or exceeds the compression ratio of the image data to the luminance data; and an image compressing portion connected to the compression ratio determining portion and performing image compression for the entire image plane of the image data in accordance with the compression ratios of the image data to the color and luminance data.

The compression ratio determining portion sets the compression ratio of the image data to the color data such that it is higher than the compression ratio of the image data to the luminance data. Thereby, a high frequency component against the color data is eliminated and generation of a false color of the image data is prevented when image compression or decompression is performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A digital still camera according to an embodiment of the present invention will now be described with reference to the drawings.

Figure 1:
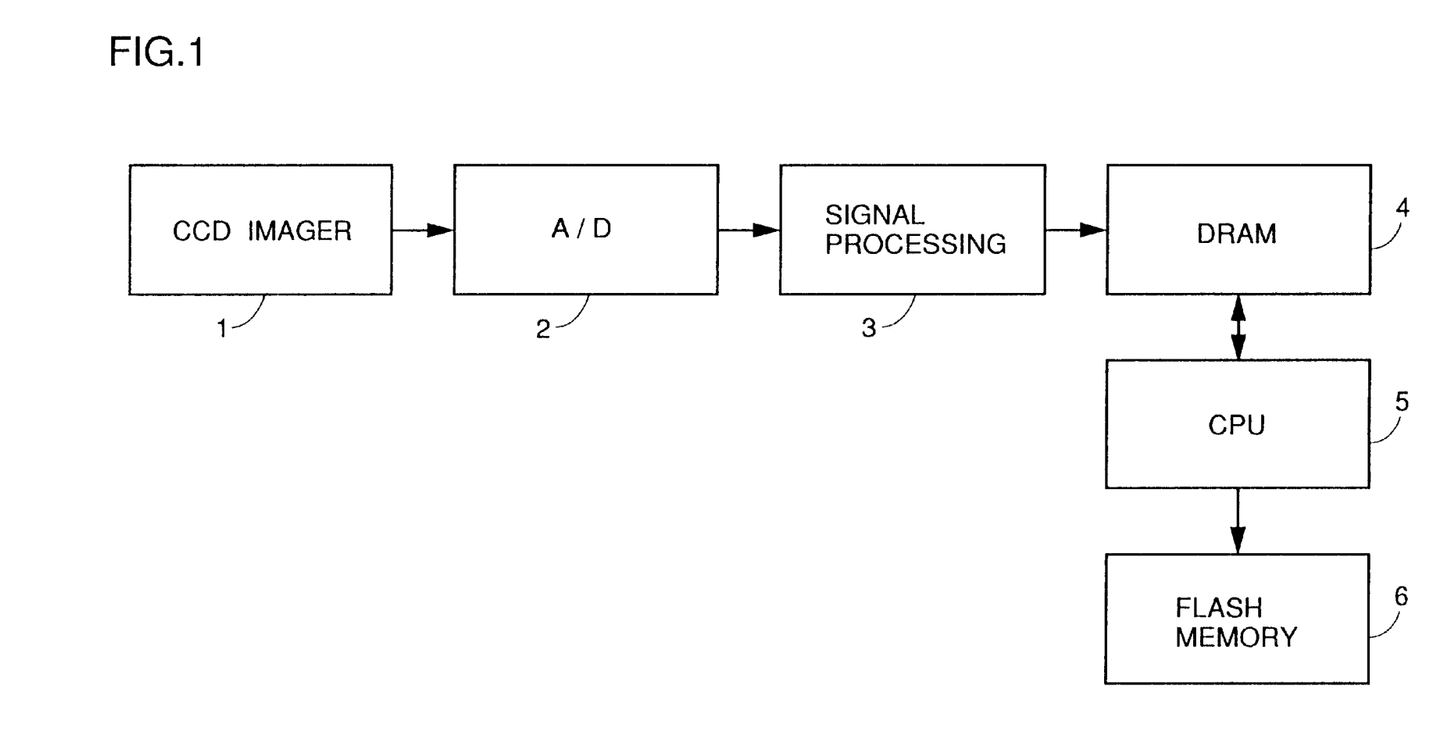
FIG. 1 is a block diagram showing a digital still camera in accordance with an embodiment of the present invention.

Referring to FIGS. 1 and 2, the digital still camera includes: a CCD imager 1 to which a primary color filter 30 is mounted having row×column=480×640 pixels and color filters of three primary colors R, G and B arranged in a mosaic like pattern; an A/D (Analog-to-Digital) converter 2 digitizing R, G and B image signals output from CCD imager 1 to image data; a signal processing circuit 3 performing well known gamma control and white balance adjustment for the R, G and B image data; a DRAM 4 storing the image data for which the gamma control and white balance adjustment have been performed; and a CPU (Central Processing Unit) 5 calculating an optimum image compression ratio and, in accordance with the compression ratio, compressing the image data which has been stored in DRAM 4 for writing it to a flash memory 6.

The image data which has been stored in DRAM 4 includes, for a pixel to which one of the R, G and B color filters is mounted, only the image data corresponding to the color of that color filter, but not the image data corresponding to other two colors.

CPU 5 performs data transmission to and from DRAM 4 and flash memory 6. CPU 5 also performs a color separating operation for interpolating the image data corresponding to the two colors which are not included in a given pixel using the surrounding image data, so as to generate image data of three primary colors over all pixels using the R, G and B image data which have been stored in DRAM 4. Further, CPU 5 converts. the R, G and B image data to Y, U and V image data of a luminance signal Y and color difference signals B−Y(=U) and R−Y(=V) for every pixel in accordance with a specific arithmetic expression. Then, the resulting Y, U and V image data are compressed in accordance with a standard of JPEG (Joint Photographic coding Experts Group). In addition, a predicting operation for predicting a data size of the image data corresponding to one image plane after compression is performed. Further, a calculating operation is performed for calculating a compression ratio for signal compression, that is, a Q factor which governs the compression ratio, so as to store the image data in a region of a prescribed data size of one image plane in flash memory 6. These operations are all performed by a software.

Referring to FIGS. 3 to 9, an operation of the digital still camera will be described.

Figure 3:
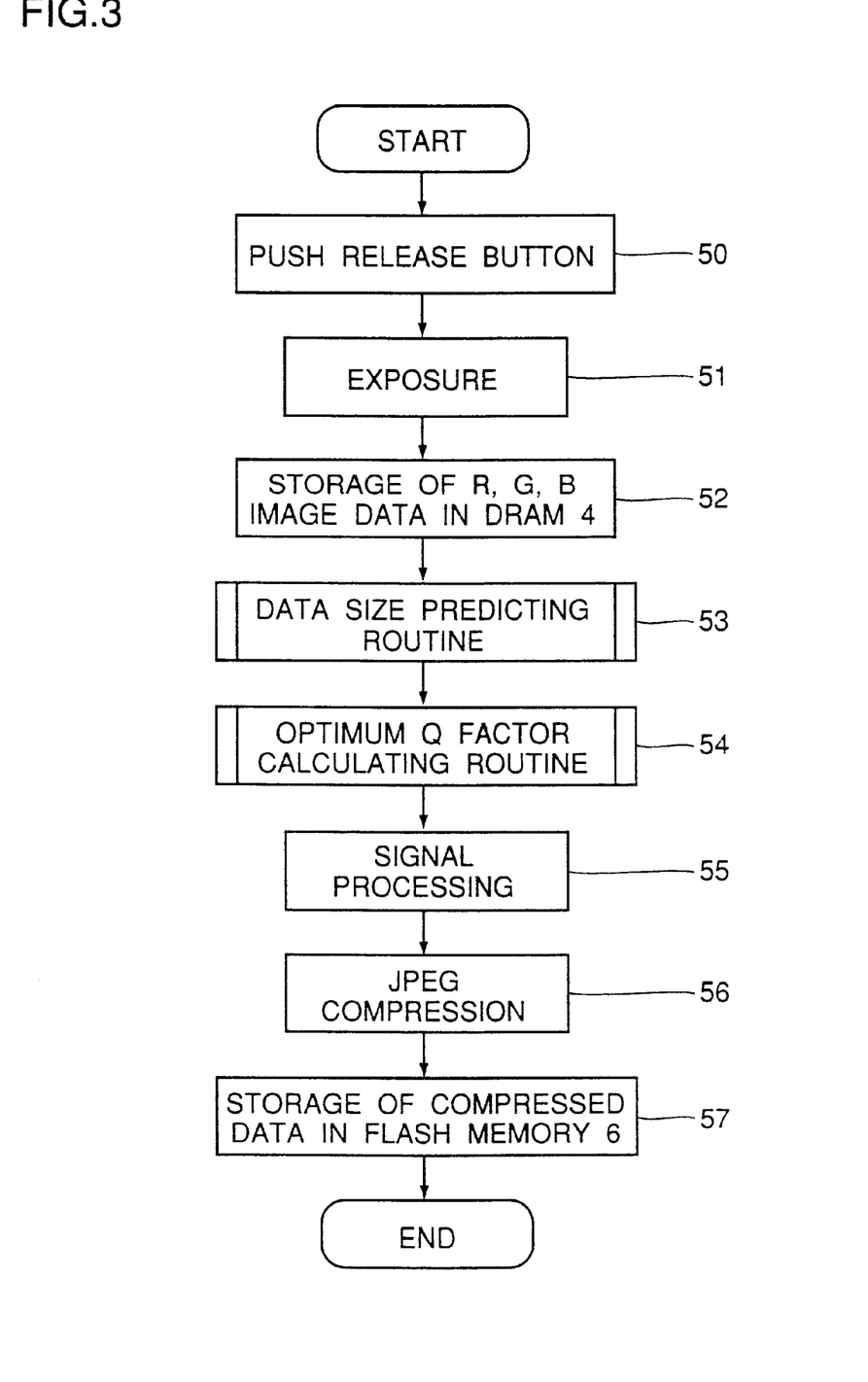
FIG. 3 is a flow chart showing a process through storage of image data in a flash memory.

Referring to FIG. 3, immediately after a photographer pushes a release button (not shown) (step 50), CCD imager 1 is exposed to light (step 51). The resulting R, G and B image signals are stored in DRAM 4 as R, G and B image data through A/D converter 2 and signal processing circuit 3 (step 52). When the R, G and B image data corresponding to one image plane are stored in DRAM 4, CPU 5 calculates a value of Q factor q such that the size of compressed image data would equal to a prescribed size (step 53). In accordance with Q factor q obtained in step 53, Q factors $q_{F\_UV}$ and $q_{F\_y}$ of the image data to color and luminance data to prevent generation of a false color are respectively calculated (step 54). CPU 5 reads the R, G and B image data corresponding to the pixels from DRAM 4 and converting them to the Y, U and V image data (step 55). The JPEG compression is performed for the image data in accordance with Q factors $q_{F\_UV}$ and $q_{F\_y}$ of the image data to the color and luminance data and the Y, U and V image data obtained in step 55 (step 56). CPU 5 stores the image. data, for which the JPEG compression has been performed, in flash memory 6 (step 57).

Figure 4:
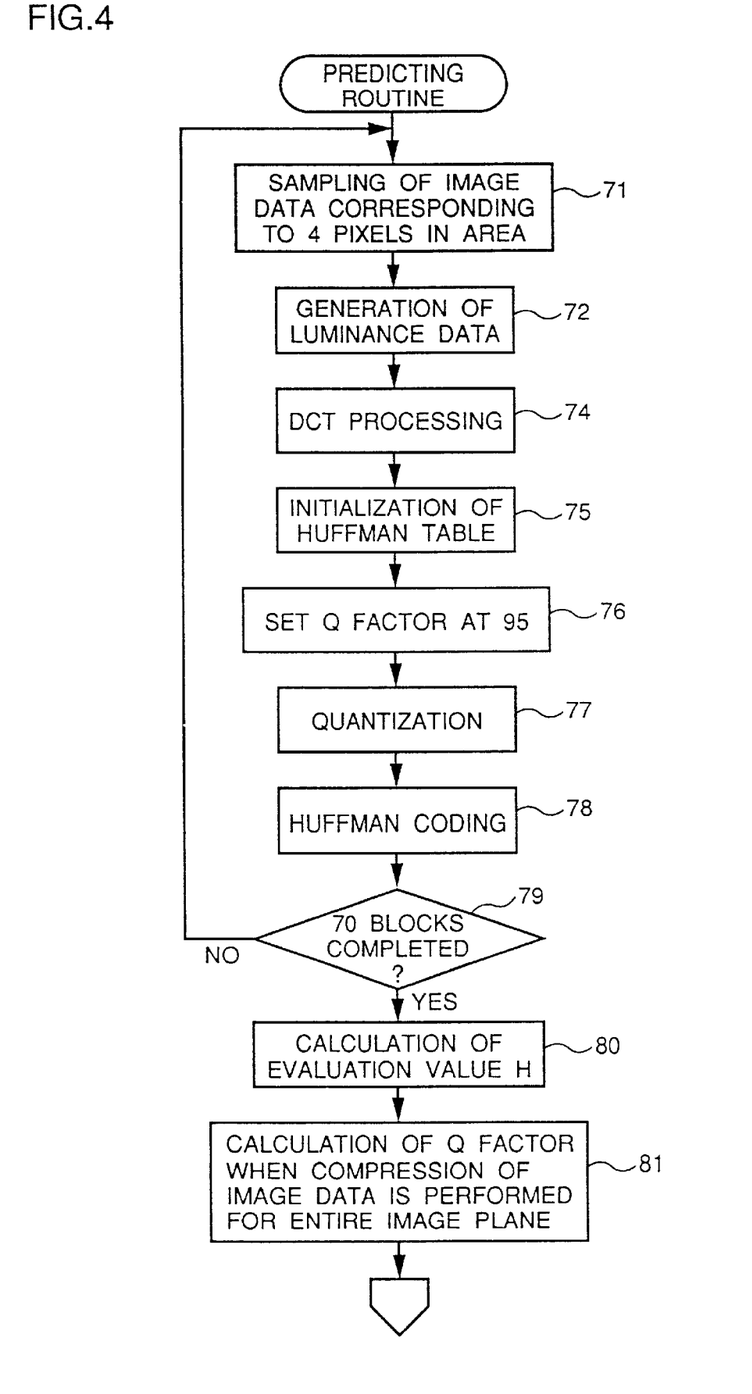
FIG. 4 is a flow chart showing a data size predicting routine.
Figure 5:
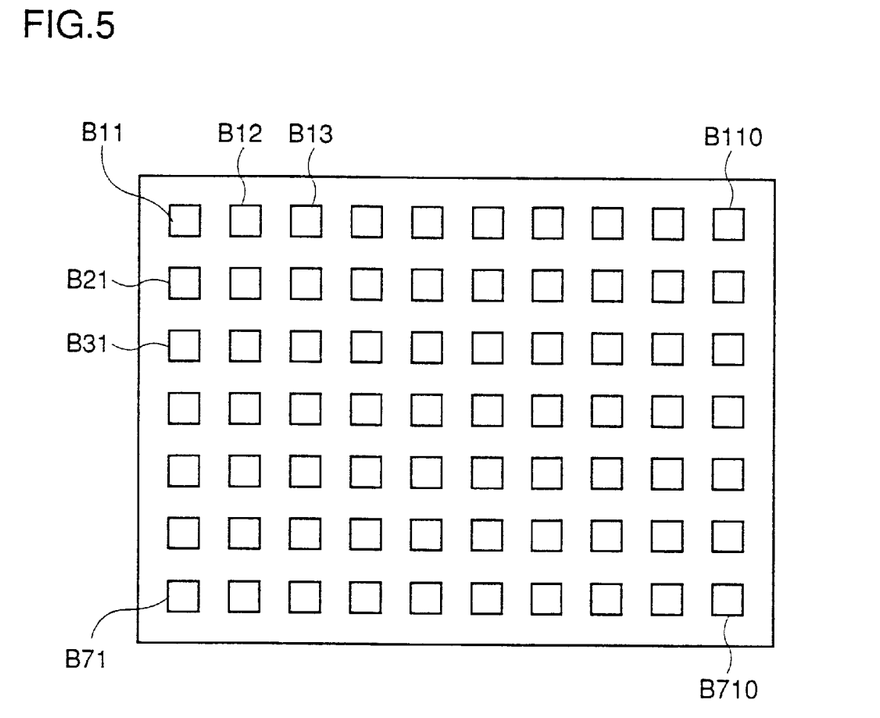
FIG. 5 is a diagram showing an arrangement of seventy blocks.

Referring to FIGS. 4 to 8, a process of calculating the value of Q factor q in step 53 will now be: described in detail. As shown in FIG. 5, seventy blocks B11 to B710 each including eighty-one (row×column=9×9) pixels are formed over all of the areas for pixels in CCD imager 1 and, the image data corresponding to the pixels included in these blocks are successively sampled (step 71). Referring to FIG. 5, blocks B11 to B710 are arranged over the entire image plane with almost constant spaces therebetween in an arrangement of row×column=7×10. Here, a relation between the pixels and color filters within the block is shown in FIG. 6A or 6B.

Figure 6A:
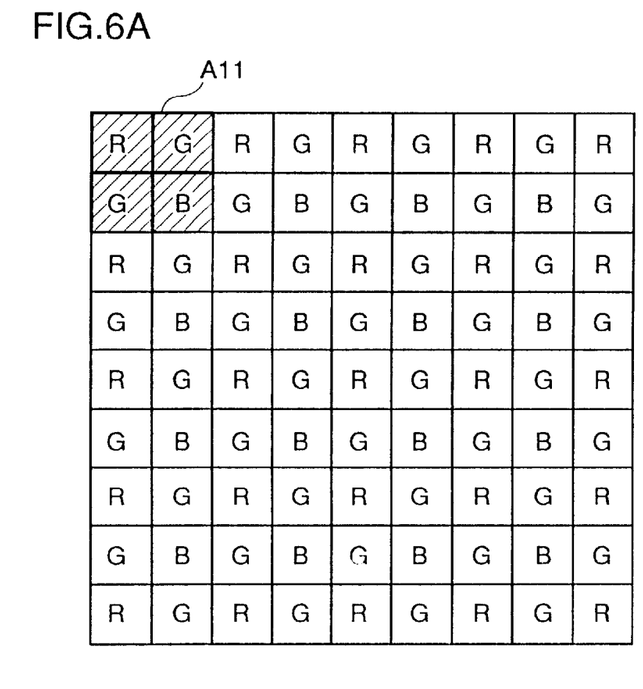
FIGS. 6A and 6B are diagrams shown in conjunction with a luminance data generating region including four pixels in a block.

Then, luminance data is generated in accordance with the image data corresponding to four pixels having the R, G and B filters for every block (step 72). A method of generating the luminance data will now be described in detail. A relation between the pixels and color filters within one block is shown in FIG. 6. Assume that four (row×column=2×2) pixels in the upper left portion of the drawing form an area A11, which is shadowed in FIG. 6A. The image data r and b of the pixels corresponding to the R and B filters in this area are selected. Further, the image data of the pixels corresponding to two G filters positioned in the upper and lower columns in this area are respectively selected as g1 and g2. Luminance data y is calculated as Y11 in accordance with an arithmetic expression y=3×r+3×(g1+g2)+b.

Figure 6B:
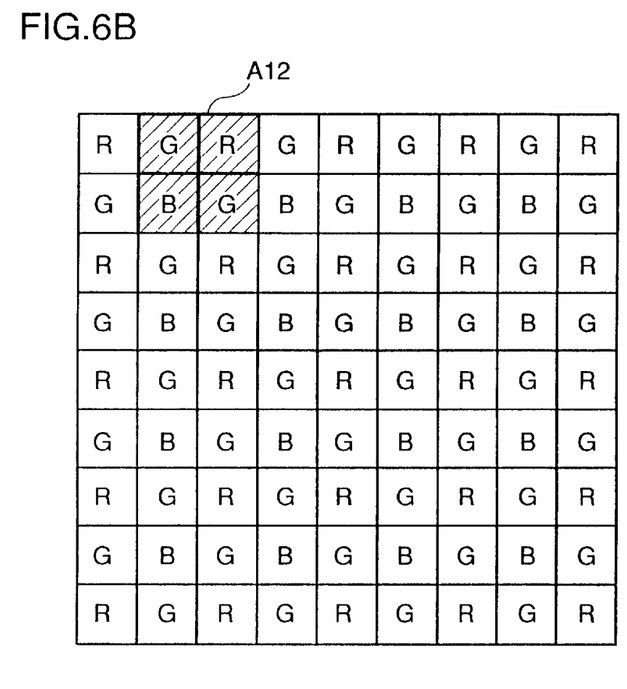

Then, as shown by a shadow in FIG. 6B, area A11 is shifted in a column direction by one pixel and an area A12 is set. As in the case of area A11, luminance data Y12 is calculated in accordance with the image data corresponding to four pixels in this area. Similarly, eight luminance data Y11 to Y18 in the first column are calculated while shifting and setting the area in the column direction by one pixel at a time. When all of the eight luminance data in the first column are thus generated, the already set eight areas are shifted in a row direction by one pixel, so that another eight areas are set. Then, eight luminance data Y21 to Y28 are generated. By repeating a similar process for the entire block, sixty four (row×column=8×8) luminance data are ultimately generated from one block.

Thereafter, by using only the luminance data resulting from one block, signal compression in accordance with the standard of JPEG, that is, a series of processes including a DCT (Discrete Cosine Transformation), quantization and Huffman coding, is performed. It is noted that the signal compression in accordance with JPEG is a well known art.

Figure 7:
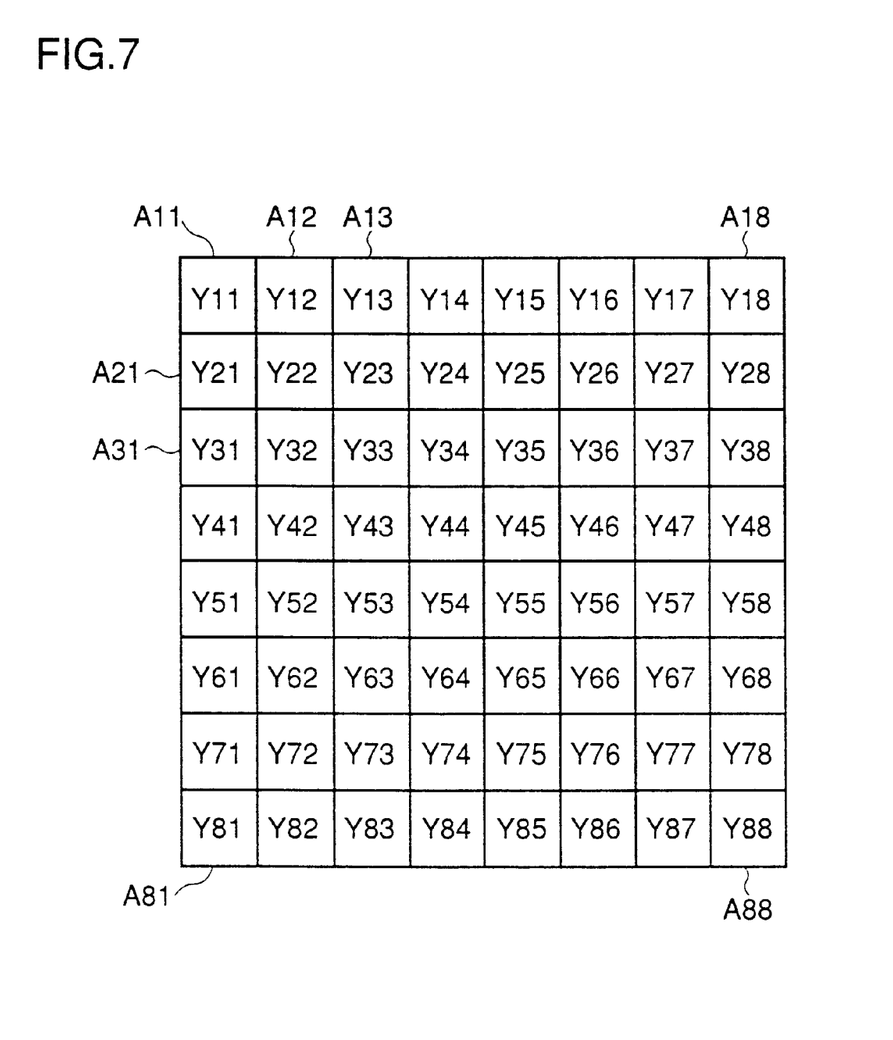
FIG. 7 is a diagram shown in conjunction with 8×8 luminance data obtained from one block.

Referring to FIG. 7, the signal compression will now be described in detail. Well known two dimensional DCT is performed for the sixty four luminance data in the block. The DCT allows calculation of sixty four (8×8) DCT coefficients Sij (i, j=integer of 1 to 8) in accordance with the luminance data (step 74).

Subsequently, a Huffman table is initialized which is used for subsequent Huffman coding (step 75). Further, Q factor q related to the compression ratio for signal coding of only the luminance data is set at 95. (step 76).

Quantization of the luminance data is performed (step 77). In the quantization, linear quantization is performed with a step size which differs between the positions of 8=8 coefficients using a quantization table Qij (i, j=integer of 1 to 8). More specifically, DCT coefficient Sij is divided by Qij to obtain a quantized coefficient $r_{ij}$ (i, j=integer of 1 to 8). In other words, $r_{ij}$=round(Sij/Qij). It is noted that "round" represents an operation of increasing or decreasing to the closest integer.

Here, by changing a value of quantization table Qij, the compression ratio can be controlled. As a result, image quality and a coded information amount can be controlled. More specifically, when Qij is set at a large value, the coded information amount is relatively large and the image can be coded with high image quality. On the other hand, when Qij is set at a small value, the quantized coefficient becomes also small and the coded information amount is decreased, resulting in low image quality. By thus changing the value of quantization table Qij, both image quality and coded information amount are freely controlled.

Then, if a preliminary prepared basic quantization table Q'ij is multiplied by a value f which is determined by Q factor q, generally, the image quality and coded information amount obtained by compression can be controlled by Q factor q. More specifically, Q factor q is a value between 1 and 100 and value f by which the quantization table would actually be multiplied is determined in accordance with the expression f=5000/q (if q<50) and the expression f=200−q×2 (if q>50). If q=10, for example, f=500, and quantization table Qij used for quantization would be a reference quantization table Q'ij×500. Ultimately, coefficient $r_{ij}$=round{Sij/(Q'ij×500)} is obtained. On the other hand, if q=90, f=20 and quantization table Qij would be Q'ij×20. Ultimately, coefficient $r_{ij}$=round{Sij/(Q'ij×20)} is obtained.

Therefore, as Q factor q becomes closer to 0, the quantization table is multiplied by a larger value, whereby the value of the quantization table is increased. Coefficient $r_{ij}$ becomes accordingly smaller, thereby reducing the image quality. In this case, however, the coded information amount is reduced and the compression ratio is set at a high value. If the Q factor is close to 100, on the other hand, the quantization table is multiplied by a smaller value and the value thereof becomes smaller than in the case described above. Thus, coefficient $r_{ij}$ becomes large to increase the image quality. However, the compression ratio is substantially set at a low value as a coded information amount is increased.

In calculating a prediction value in the present embodiment, quantization table Qij is multiplied by a relatively small value such as 10 since 95 has been set as Q factor q in step 76. Thus, quantization is performed such that a significantly large coded information amount is obtained.

After the quantization is completed, well known Huffman coding is performed for DCT coefficient $r_{ij}$ and binary coded data is output (step 78). Here, the greater the bit number of the coded data is, the larger amount of information it includes.

A series of processes from steps 71 to 78 is performed for each of seventy blocks. When the coded data is obtained for every block, step 80 is performed via step 79.

In step 80, the resulting bit numbers of the coded data for all of the seventy blocks are summed and the sum is divided by four to be counted in terms of a byte number and output as a data size evaluation value H. In other words, a data length of the image data, which is a collection of the coded data for all of the blocks, is output as evaluation value H.

Thus, when Q factor q is set at 95 and a sufficiently large coded information amount is obtained, if the resulting evaluation value H is high, the image of an object projected on the image plane has a complicated pattern and a number of luminance edges exist judging from the seventy blocks on the image plane which have been sampled. Thus, it is predicted that the data size of the image data obtained by performing signal compression for the entire image plane would be large. If a small evaluation value H is obtained, the object has a relatively simple pattern and it is predicted that the data size of the image data obtained by performing signal compression for the entire image plane would be small.

Then, using evaluation value H, a Q factor is calculated which is the most suitable for setting the image data which would be obtained by the subsequent compression of the image data for the entire image plane to a prescribed desired data size (step 81). More specifically, Q factor q is calculated in accordance with an expression q=M×H−N. Here, M and N are prescribed coefficients and predetermined by performing an experiment for every desired data size as they change according to the method of signal processing (for example according to the amount of contour correction). Especially, coefficient M corresponding to a slope tends to be large as evaluation value H increases. Accordingly, in the present embodiment, two coefficients M1 and M2 are prepared as M in accordance with evaluation value H. When evaluation value H is below and above a predetermined threshold value h, coefficients M2 and M1 shown in a table in FIG. 8 are respectively used.

Figure 8:
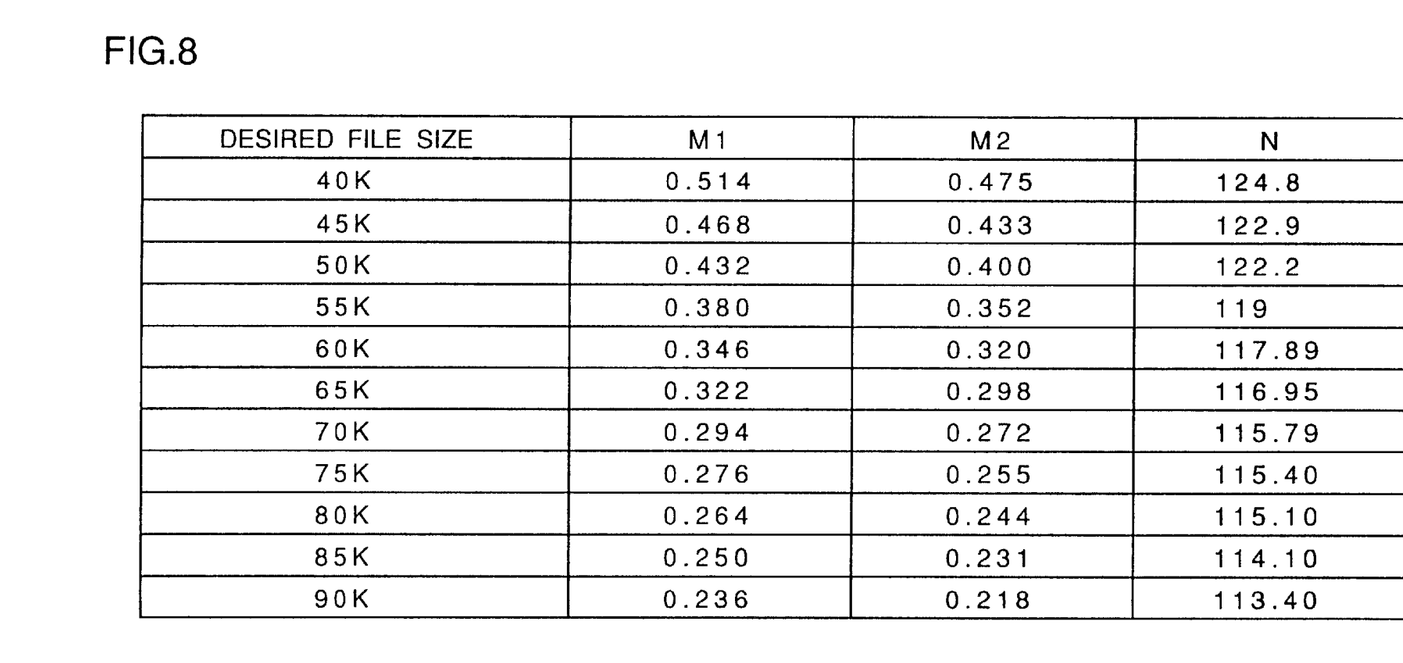
FIG. 8 is a table showing different parameters set for every desired data size.

Referring to FIG. 8, a relation between a desired data size of the image data of a single static image stored in flash memory 6 and coefficients M and N is shown. For example, when the desired data size is 80 kilo bytes, if evaluation value H exceeds threshold value h, the Q factor is solved by applying evaluation value H obtained in step 80 to the expression q=0.264×H−115.10.

Thus, compression in accordance with the JPEG is performed for the sampled luminance data of seventy blocks. Image plane evaluation is performed from the resulting data length of the image data, and the data size when the JPEG compression is performed for the entire image plane is predicted and quantified as the evaluation value. The Q factor associated with the compression ratio for compressing the image data included in the entire image plane to the desired data size for storage is calculated in accordance with an arithmetic expression using the evaluation value.

Figure 9:
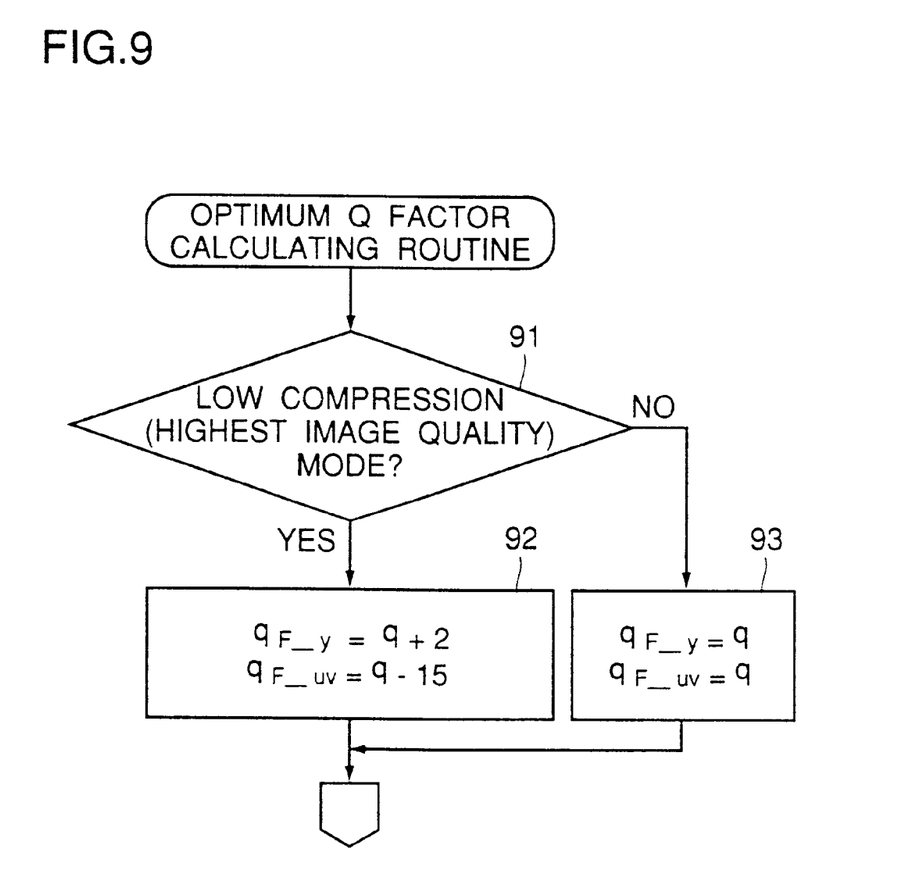
FIG. 9 is a flow chart showing an optimum Q factor calculating routine.

When the Q factor used for performing image compression for the image data on the entire image plane is determined, a data size predicting routine 53 is completed and an optimum Q factor calculating routine 54 is started. It is noted that, in the JPEG compression performed in predicting routine 53, only seventy blocks are sampled and processed, so that it is completed with much shorter time as compared with the case where the entire image plane is compressed.

Referring to FIG. 9, optimum Q factor calculating routine 54 will be described in detail. Here, assume that the JPEG compression or decompression is performed using Q factor q which has been obtained in data size predicting routine 53. With relatively large Q factor q or relatively low compression ratio, the false color is more likely to be generated. Therefore, when Q factor q is sufficiently large, Q factor $q_{F\_UV}$ of the image data to the color data must be set at a substantially low value, or the compression ratio of the image data to the color data must be set at a substantially high value, to prevent generation of the false color. When the desired data size is relatively large, Q factor q tends to be high. Thus, with relatively large desired data size or in a low compression (the highest image quality) mode (YES in step 91), the value of Q factor $q_{F\_UV}$ of the image data to the color data is obtained in accordance with an expression $q_{F\_UV}$=q−15. Using the value of $q_{F\_UV}$ the image data size when the JPEG compression is performed can be made smaller than the desired data size. Accordingly, by setting the value of Q factor $q_{F\_y}$ of the image data to the luminance data such that $q_{F\_y}$=q+2, the image data size when the JPEG compression is performed is controlled to be equal to the desired data size (step 92). On the other hand, in a high compression (standard image quality) mode (NO in step 91), as the value of Q factor q is relatively low, Q factor q is applied as Q factors $q_{F\_UV}$ and $q_{F\_y}$ (step 93).

It is noted that the value added to or subtracted from Q factor q (15 and 2) in solving Q factors $q_{F\_UV}$ and $q_{F\_y}$ in step 92 has been determined by the experiment, but other values may be employed. In addition, when there are several different desired data sizes or compression modes, the values subtracted from and added to Q factor q in solving Q factors $q_{F\_UV}$ and $q_{F\_y}$ may be set at a higher value, respectively, in a mode in which the lower compression ratio is employed.

In a signal processing routine 55, CPU 5 reads the image data of each pixel out of DRAM 4 and performs the color separating operation. In the color separating operation, two of the R, G and B image data missing in each pixel are interpolated by an average value of surrounding image data of the same color. Thereby, image data of three primary colors R, G and B for every pixel is generated.

After the color separate operation is completed, CPU 5 converts the R, G and B image data to Y, U and V image data of luminance signal data Y and color difference signal data B−Y(=U) and R−Y(=V) for every pixel in accordance with the following expressions (1).

$$Y=0.2990 \times R+0.5870 \times G+0.1140 \times B$$

$$U=-0.1684 \times R-0.3316 \times G+0.5000 \times B$$

$$V=0.5000 \times R-0.4187 \times G-0.0813 \times B \quad (1)$$

Here, each of U and V image data is reduced to half in the row and column directions. This is accomplished by utilizing the characteristics that the human eyes are sensitive to the change of luminance, but relatively not sensitive to the change of color.

The Y, U and V image data, which has been thus reduced, are temporarily stored in DRAM 4 by pixel.

Then, CPU 5 reads the Y, U and V image data out of DRAM 4 and sequentially performs the JPEG image compression including a series of processes of the DCT, quantization and Huffman coding for each of the Y, U and V image data (step 56). In other words, CPU 5 performs DCT for each of pixel blocks including row×column=8×8 pixels. The resulting DCT coefficient is divided and quantized in the quantization table. Then, the quantized data is Huffman coded to generate coded data. The same series of processes is repeated over the entire image plane to obtain image data, which is a collection of the ultimately obtained coded data.

It is noted that, in the quantization by the JPEG compression in step 55, the quantization table is used which is obtained by multiplying a reference table by a value of f, which has been calculated from Q factors $q_{F\_Y}$ and $q_{F\_UV}$ respectively for luminance and color signals determined in optimum Q factor calculating routine 54 in a similar manner as described above. In other words, the quantization table obtained by Q factor $q_{F\_Y}$ is used for quantizing the Y image data. The quantization table obtained from Q factor $q_{F\_UV}$ is used for quantizing the U and V image data.

When the series of the JPEG processes of image compression is completed, the image data of the desired data size is stored in flash memory 6.

It is noted that, in predicting and calculating routines 53 and 54, the Q factor used for compression of the image data on the entire image plane is determined in accordance with the prediction based on the sampling result of the seventy blocks. The image data which has been obtained by compression using the Q factor which has actually been determined here is inevitably of the size more or less different from the desired data size. Then, it is needless to say that the desired data size can be set to a slightly larger size in consideration of the difference.

When the data size of the image data obtained by compression exceeds the desired data size, a prescribed value (for example of 1) is subtracted from the value of Q factor q and the process following step 54 can be repeated.

As in the foregoing, according to the present invention, generation of the false color during the image compression or decompression can be reduced. In addition, the data size of the image data obtained by compression can be set to the desired data size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data compression apparatus, comprising:
   preliminary image compressing portion for compressing image data in a sampling region set in a specific position on an image plane for obtaining preliminary compressed image data;
   data size evaluation value calculating portion connected to said preliminary image compressing portion for calculating a data size evaluation value from a data length of said preliminary compressed image data;
   compression ratio determining portion connected to said data size evaluation value calculating portion for determining compression ratios of the image data to color and luminance data in accordance with said data size evaluation value such that a data size of the compressed image when image compression is performed for the entire image plane of said image data equals a prescribed desired data size and such that said composition ratio of the image data to the color data equals to or exceeds said compression ratio of the image data to the luminance data; and
   image compressing portion connected to said compression ratio determining portion for performing image compression for said entire image plane of said image data in accordance with said compression ratios of the image data to the color and luminance data.

2. The image data compression apparatus according to claim 1, wherein said compression ratio determining portion includes:
   compression ratio predicting portion connected to said data size evaluation value calculating portion for predicting a compression ratio which allows the data size of the compressed image when the image compression is performed for the entire image plane of said image data to be equal to said prescribed desired data size in accordance with said data size evaluation value; and
   compression ratio adjusting portion connected to said compression ratio predicting portion for increasing and decreasing said compression ratio to obtain said compression ratio of the image data to the color data and said compression ratio of the image data to the luminance data, respectively.

3. The image data compression apparatus according to claim 2, further comprising:
   image compression mode setting portion for setting an image compression mode in accordance with said prescribed desired data size,
   wherein said compression ratio adjusting portion includes a portion for adding and subtracting first and second values determined in accordance with said prescribed desired data size to and from said compression ratio to obtain said compression ratios of the image data to the color and luminance data.

4. A method of compressing image data, comprising the steps of:
   compressing image data in a sampling region set in a specific positioning an image plane for obtaining preliminary compressed image data and calculating a data size evaluation value from a data length of said preliminary compressed image data;
   determining compression ratios of image data to color and luminance data in accordance with said data size evaluation value such that a data size of a compressed image when image compression is performed for an entire image plane of said image data equals a prescribed desired data size and such that said compression ratio of the image data to the color data is equal to or greater than said compression ratio of the image data to the luminance data; and
   performing image compression for said entire image plan of said image data in accordance with said compression ratios of the image data to the color and luminance data.

5. The method of compressing image data according to claim 4, wherein said step of determining the compression ratios includes the steps of:
   predicting a compression ratio which allows said data size of the compressed image when image compression is performed for said entire image plane of said image data to be equal to said prescribed desired data size in accordance with said data size evaluation value; and adjusting said compression ratio to values increased and decreased from said compression ratio to obtain said compression ratios of the image data to the color and luminance data, respectively.

6. The method of compressing image data according to claim 5, further comprising the step of setting an image compression mode in accordance with said prescribed desired data size, wherein said step of adjusting said compression ratio includes the step of setting said compression ratios of the image data to the color and luminance data by adding and subtracting first and second values determined in accordance with said prescribed desired data size to and from said compression ratio.

7. A digital camera, comprising:

video signal receiving apparatus for receiving a video signal;

an A/D converter digitizing said video signal output from said video signal receiving portion and converting it to image data;

storing portion for storing said image data;

preliminary image compressing portion for compressing said image data in a sampling region set in a specific position on an image plane to obtain preliminary compressed image data;

data size evaluation value calculating portion connected to said preliminary image compressing portion for calculating a data size evaluation value from a data length of said preliminary compressed image data;

compression ratio determining portion connected to said data size evaluation value calculating portion for determining compression ratios of image data to color and luminance data in accordance with said data size evaluation value such that a data size of compressed image when image compression is performed for the entire image plane of said image data equals a prescribed desired data size and such that said compression ratio of the image data to the color data equals to or exceeds said compression ratio of the image data to the luminance data; and image compressing portion connected to said compression ratio determining portion for performing image compression for the entire image plane of said image data in accordance with said compression ratios of the image data to the color and luminance data.

8. The digital camera according to claim 7, wherein said compression ratio determining portion includes:

compression ratio predicting portion connected to said data size evaluation value calculating portion for predicting a compression ratio which allows the data size of the compressed image when image compression is performed for the entire image plane of said image data to be equal to said prescribed desired data size in accordance with said data size evaluation value; and compression ratio adjusting portion connected to said compression ratio predicting portion for adjusting said compression ratio to values increased and decreased from said compression ratio to obtain said compression ratios of the image data to the color and luminance data, respectively.

9. The digital camera according to claim 8, further comprising image compression mode setting portion for setting an image compression mode in accordance with said prescribed desired data size, wherein said compression ratio adjusting portion includes portion for adjusting adding and subtracting first and second values determined in accordance with said prescribed desired data size to and from said compression ratio to obtain said compression ratios of the image data to the color and luminance data, respectively.

* * * * *